United States Patent
Shirase et al.

(10) Patent No.: US 6,774,753 B2
(45) Date of Patent: Aug. 10, 2004

(54) NORMALLY CLOSED ELECTROMAGNETIC VALVE

(75) Inventors: Takaomi Shirase, Nagano-ken (JP); Naoki Masuda, Nagano-ken (JP)

(73) Assignee: Nissin Kogyo Co., Ltd., Nagano-ken (JP)

( * ) Notice: Subject to any disclaimer, the term of this patent is extended or adjusted under 35 U.S.C. 154(b) by 0 days.

(21) Appl. No.: 10/436,204

(22) Filed: May 13, 2003

(65) Prior Publication Data

US 2003/0214377 A1 Nov. 20, 2003

(30) Foreign Application Priority Data

May 15, 2002 (JP) .................................... P. 2002-140259
Apr. 8, 2003 (JP) .................................... P. 2003-103632
Apr. 8, 2003 (JP) .................................... P.2003-103633

(51) Int. Cl.[7] ............................ H01F 7/08; F16K 31/02
(52) U.S. Cl. .................................... 335/220; 251/129.15
(58) Field of Search ................................ 335/215, 220; 251/129.15; 303/119.2

(56) References Cited

U.S. PATENT DOCUMENTS 5,445,448 A * 8/1995 Wolff et al. .............. 303/119.2
5,542,755 A 8/1996 Staib et al.

FOREIGN PATENT DOCUMENTS

JP 7-151258 6/1995

OTHER PUBLICATIONS

European Search Report dated May 11, 2003.

* cited by examiner

Primary Examiner—James R. Scott
(74) Attorney, Agent, or Firm—McGuireWoods LLP

(57) ABSTRACT

A normally closed electromagnetic valve has a cylindrical valve housing; a valve seat member; a fixed core; a movable core; a valve body; a return spring; and, a coil, one side of the valve housing being housed in a mounting hole opened on one end of a substrate so as to be restricted in axial movement thereof toward the interior of the mounting hole, wherein a large diameter portion is provided in the axially middle portion of the valve housing, the cylindrical valve seat member forms an annular chamber with the inner surface of the large diameter portion, the annular chamber communicates to the valve chamber, and is fixed to and fitted in one end of the valve housing and communicating holes through which the annular chamber is communicated to the exterior of the valve housing are provided in the large diameter portion.

8 Claims, 5 Drawing Sheets

NORMALLY CLOSED ELECTROMAGNETIC VALVE

BACKGROUND OF THE INVENTION

1. Field of the Invention

The present invention relates to a normally closed electromagnetic valve and more particularly to improvements in a normally closed electromagnetic valve comprising a cylindrical valve housing having a thin wall, a valve seat member fitted in and fixed to one end of the valve housing, a fixed core fixed liquid-tightly to the other end of the valve housing, a movable core forming a valve chamber with the valve seat member and housed in the valve housing opposed to the fixed core, a valve body fixed to the movable core seatably on a valve seat formed on the valve seat member facing the valve chamber, a return spring provided between the fixed core and the movable core giving a spring force that causes the valve body to be seated on the valve seat and a coil for generating an electromagnetic force that causes the movable core to be attracted to the fixed core during excitation, the valve housing being housed in a mounting hole provided open on one side of a substrate on one end thereof in such an arrangement that the valve housing is restricted in axial movement toward the interior of the mounting hole.

2. Description of the Related Art

Such a normally closed electromagnetic valve has heretofore been known, e.g., in JP-A-7-151258. In accordance with this disclosure, in order to mount a normally closed electromagnetic valve on a substrate with a valve housing housed in a mounting hole on one end thereof, a coil case covering a coil is provided in contact engagement with a stepped portion provided facing axially outwardly and a retainer ring provided in contact engagement with the coil case on the axially external side thereof is pressed in the external end of the mounting hole.

However, since the aforementioned related art normally closed electromagnetic valve has such an arrangement that the normally closed electromagnetic valve is incorporated in the substrate by pressing the retainer ring in the external end of the mounting hole, it can hardly be said that this type of a normally closed electromagnetic valve has a good mountability. This type of a normally closed electromagnetic valve finds difficulty in recycling because the valve housing can be difficultly detached from the substrate.

SUMMARY OF THE INVENTION

An aim of the present invention is to raise the degree of freedom of positioning of the valve chamber along the axial length of the valve housing and reduce the axial length and hence the mass of the movable core, making it possible to raise the degree of freedom of design, in such a normally closed electromagnetic valve.

An aim of the present invention is also to provide a normally closed electromagnetic valve which allows easy incorporation of the valve housing in the substrate as well as easy detachment of the valve housing from the substrate to give an enhanced mountability and recyclability.

The aforementioned aim of the present invention is accomplished with a first aspect of the present invention, that is a normally closed electromagnetic valve having: a cylindrical valve housing having a thin wall; a valve seat member fitted in and fixed to one end of the valve housing; a fixed core fixed liquid-tightly to the other end of the valve housing; a movable core forming a valve chamber with the valve seat member and housed in the valve housing so as to be opposed to the fixed core; a valve body fixed to the movable core seatably on a valve seat formed on the valve seat member facing the valve chamber; a return spring provided between the fixed core and the movable core and giving a spring force that causes the valve body to be seated on the valve seat; and, a coil for generating an electromagnetic force that causes the movable core to be attracted to the fixed core during excitation, wherein a large diameter portion is provided in the axially middle portion of the valve housing. In the first aspect, it is preferable that the cylindrical valve seat member forms an annular chamber with the inner surface of the large diameter portion, the annular chamber communicates to the valve chamber, and is fixed to and fitted in one end of the valve housing and communicating holes through which the annular chamber is communicated to the exterior of the valve housing are provided in the large diameter portion. In the first aspect, it is preferable that one side of the valve housing is housed in a mounting hole opened on one end of a substrate so as to be restricted in axial movement thereof toward the interior of the mounting hole.

In this arrangement, the degree of freedom of predetermination of position of communicating holes can be enhanced. In other words, in the case where the valve housing is in the form of simple cylinder which is uniform in diameter all over the axial length, it is necessary that the valve chamber and the communicating holes are at substantially the same position along the axial length of the valve housing. When the valve housing is provided with a large diameter portion, an annular chamber communicating to the valve chamber can be formed between the valve housing and the valve seat member. In this arrangement, the degree of freedom of positioning of the valve chamber along the axial length of the valve housing can be raised, making it possible to reduce the axial length and hence the mass of the movable core and hence raise the degree of freedom of design.

According to a second aspect of the present invention, the normally closed electromagnetic valve as set forth in the first aspect, further having retaining units for keeping one end of the valve housings housed in the mounting hole in contact engagement with the stepped portions; and a solenoid portion removably fitted on the protrude portion of the valve housings from the substrate so as to include the coil, wherein the retaining units are detachably provided in the substrate and the solenoid portion is supported on a cover which is detachably mounted on the substrate and covers the solenoid.

In accordance with the inventive constitution defined in the second aspect, the retaining unit is mounted on the substrate with the valve housing housed in the mounting hole on one end thereof, making it possible to easily incorporate the valve housing in the substrate. By removing the retaining unit from the substrate, the valve housing can be detached from the mounting hole on the one end thereof. Further, since the protrusion of the valve housing from the substrate is removably housed in the solenoid portion including a coil, the solenoid portion including a coil can be easily separated from the valve housing by removing the cover supporting the solenoid portion from the substrate. Thus, the valve housing can be incorporated in or removed from the substrate on one end thereof. By mounting the cover on the substrate with one end of the valve housing incorporated in the substrate, the protrusion of the valve housing from the substrate can be housed in the solenoid portion to form the entire normally closed electromagnetic valve. Accordingly, the valve housing can be easily incorporated in the substrate and removed from the substrate, making it possible to enhance mountability as well as recyclability.

According to a third aspect of the present invention, the normally closed electromagnetic valve as set forth in the second aspect, wherein the retaining unit includes a retainer ring housed in the mounting hole and contacting and engaging with the stepped portion, and a retaining ring detachably mounted on the inner surface of the mounting hole and contacting and engaging with the retainer ring on the axially external side of the mounting hole. In this arrangement, by receiving the valve housing in the mounting hole of the substrate on one end thereof with the retainer ring kept in contact engagement with the stepped portion of the valve housing and mounting the retaining ring on the external end of the mounting hole in contact engagement with the retainer ring, the valve housing can be mounted on the substrate, making it possible to easily incorporate the valve housing in the substrate and hence improve mountability. Further, the retaining ring can be removed from the external end of the mounting hole, making it easy to remove the valve housing from the mounting hole.

DETAILED DESCRIPTION OF THE PREFERRED EMBODIMENTS

Embodiments of implementation of the present invention will be described in connection with the inventive examples shown in the attached drawings.

Figure 1:
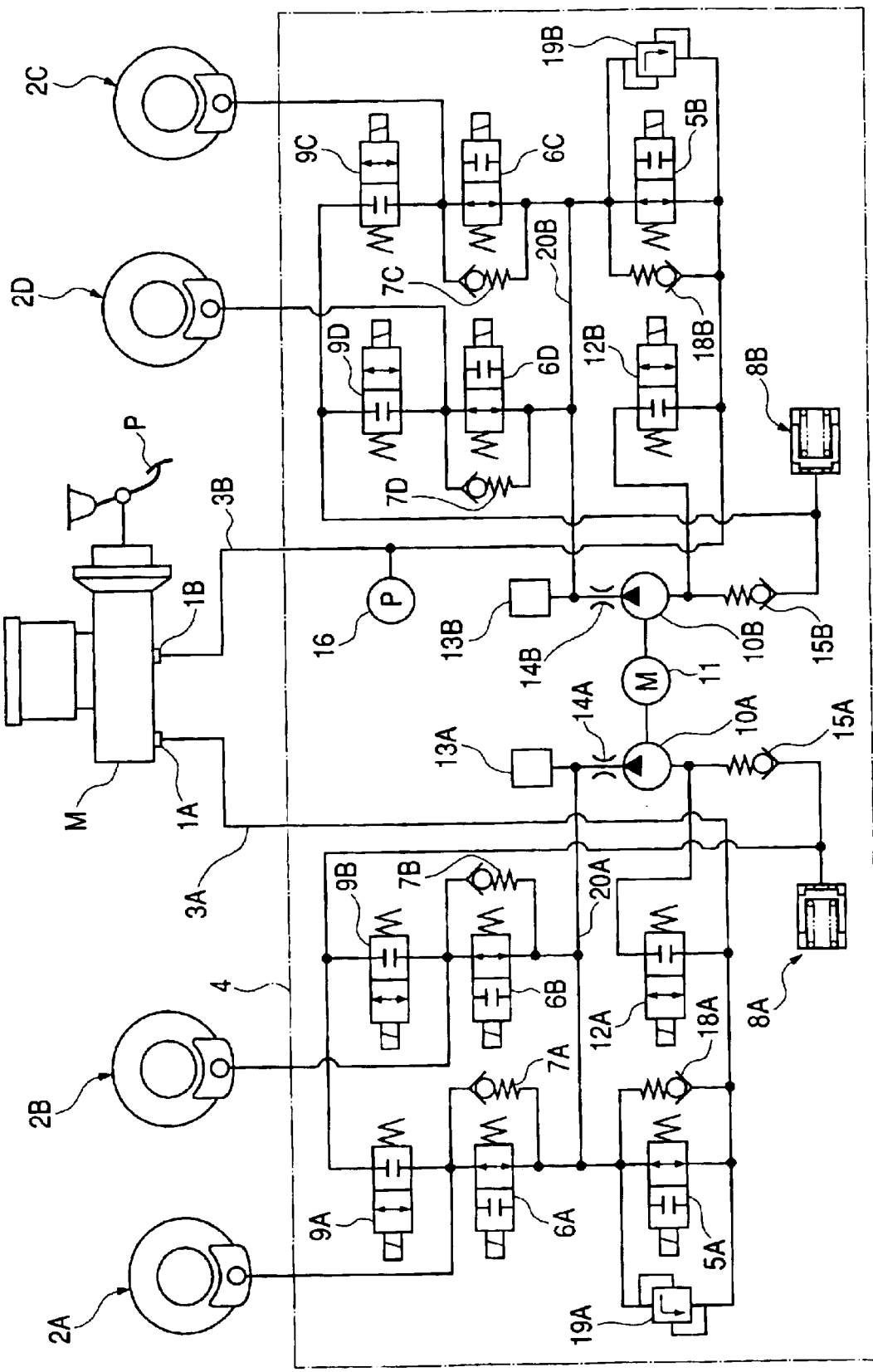
FIG. 1 is a diagram of brake fluid pressure circuit of vehicle brake device according to a first embodiment of implementation of the present invention.
Figure 2:
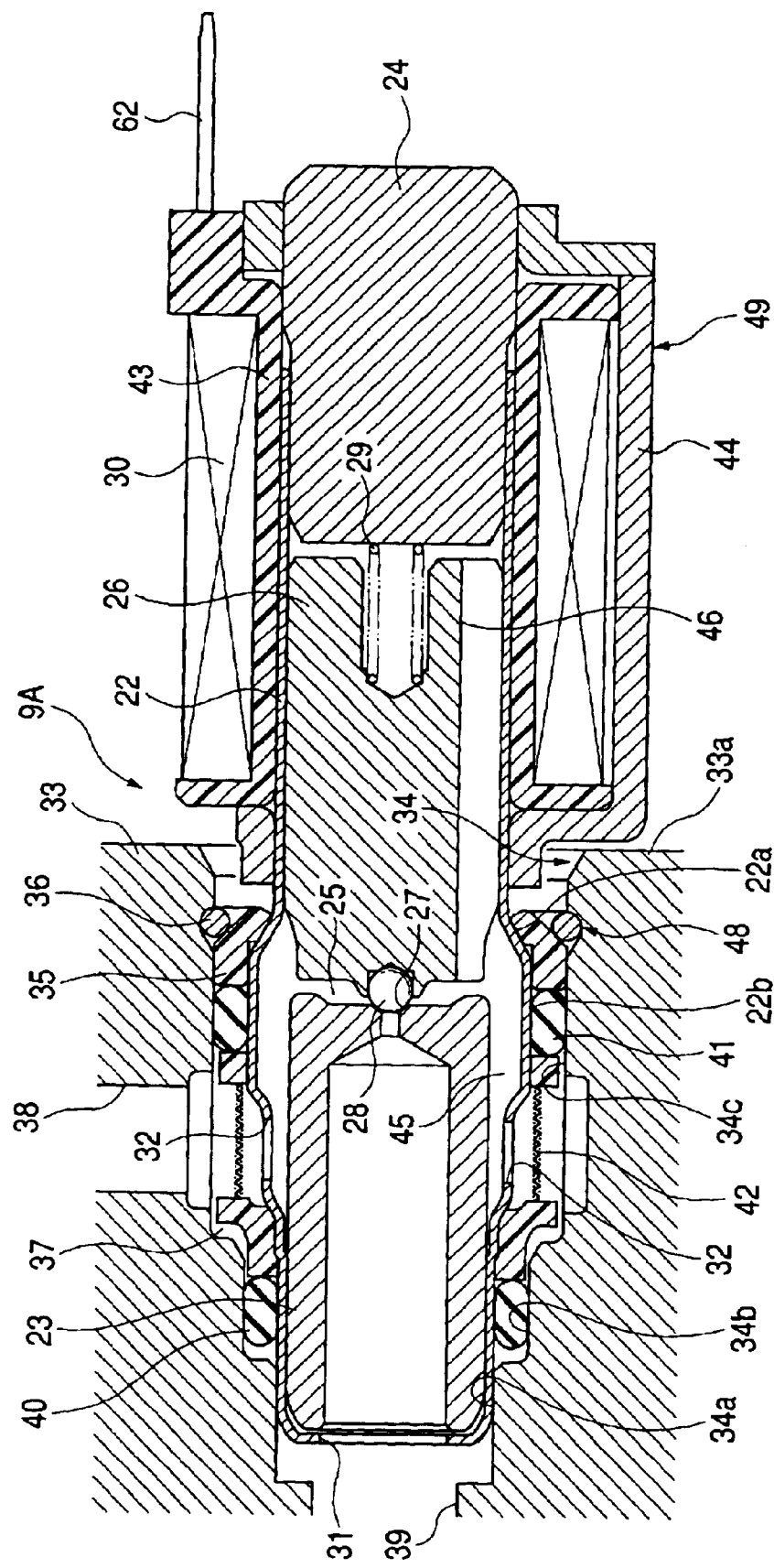
FIG. 2 is a longitudinal sectional view illustrating an outlet valve in closed state.
Figure 3:
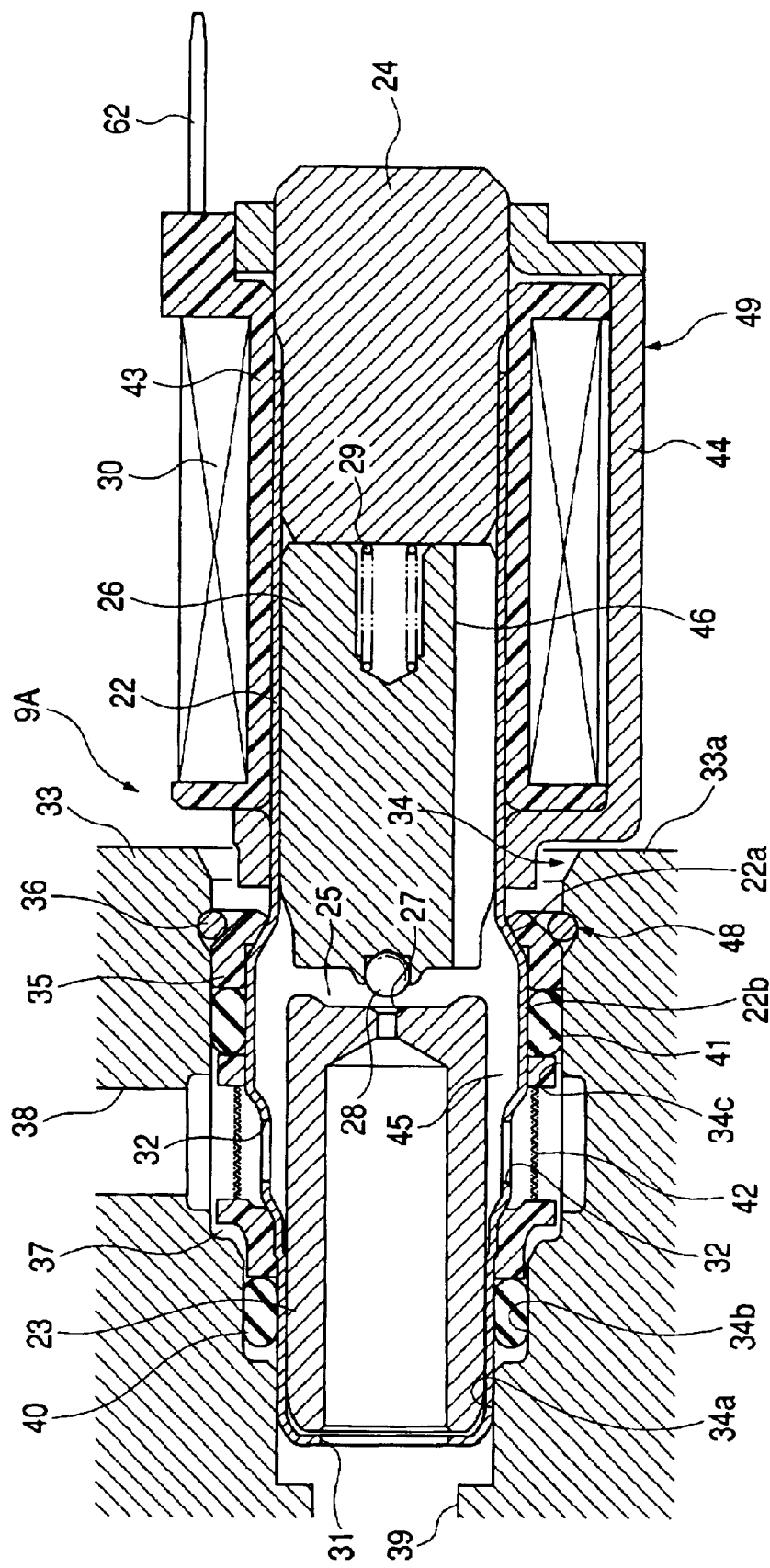
FIG. 3 is a longitudinal sectional view illustrating the outlet valve in open state.
Figure 4:
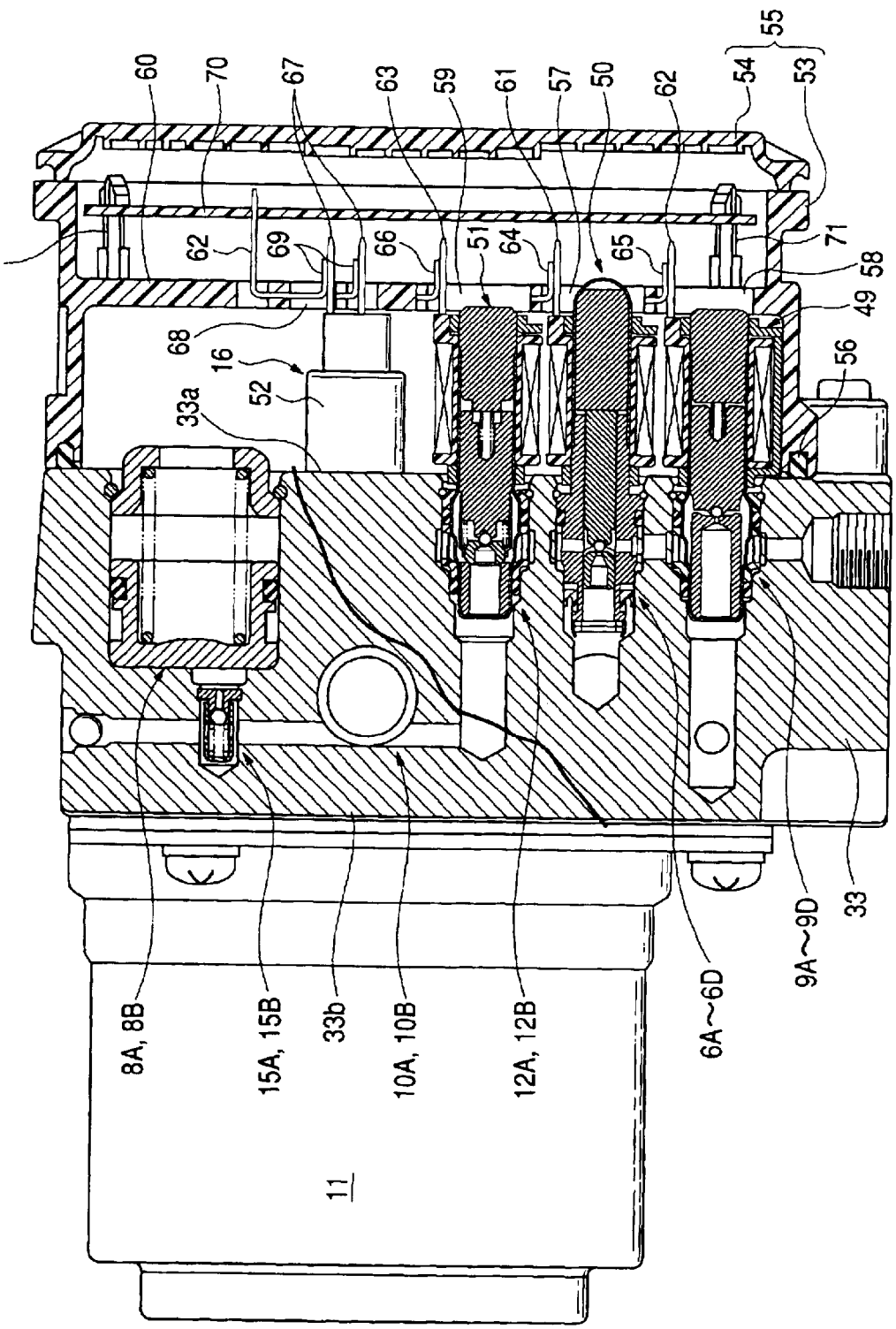
FIG. 4 is a longitudinal sectional view illustrating an essential part of a brake fluid pressure controller.

FIGS. 1 to 4 each illustrate a first embodiment of implementation of the present invention. FIG. 1 is a diagram of brake fluid pressure circuit of vehicle brake device, FIG. 2 is a longitudinal sectional view illustrating an outlet valve in closed state, FIG. 3 is a longitudinal sectional view illustrating the outlet valve in open state and FIG. 4 is a longitudinal sectional view illustrating the essential part of a brake fluid pressure controller.

In FIG. 1, a tandem master cylinder M comprises first and second output ports 1A and 1B for generating a brake fluid according to the stepping force applied to a brake pedal P by the vehicle operator. Provided between a brake 2A for front left wheel, a brake 2B for rear right wheel, a brake 2C for front right wheel and a brake 2D for rear left wheel and first and second output fluid pressure paths 3A and 3B connected to the first and second output ports 1A and 1B, respectively, is a brake fluid pressure controller 4.

The brake fluid pressure controller 4 comprises cut valves 5A, 5B which are normally closed electromagnetic valves connected to the first and second output fluid pressure paths 3A, 3B, respectively, inlet valves 6A, 6B which are normally closed electromagnetic valves provided between one of the cut valves, i.e., cut valve 5A and the brake 2A for front left wheel and brake 2B for rear right wheel, respectively, inlet valves 6C, 6D which are normally closed electromagnetic valves provided between the other cut valve, i.e., cut valve 5B and the brake 2C for front right wheel and brake 2D for rear left wheel, respectively, check valves 7A to 7D connected to the inlet valves 6A to 6D, respectively, first and second reservoirs 8A, 8B adapted for the first and second output fluid pressure paths 3A, 3B, respectively, outlet valves 9A, 9B which are normally closed electromagnetic valves provided between the first reservoir 8A and the brake 2A for front left wheel and brake 2B for rear right wheel, respectively, outlet valves 9C, 9D which are normally closed electromagnetic valves provided between the second reservoir 8B and the brake 2C for front right wheel and brake 2D for rear left wheel, respectively, a first pump 10A connected to the first reservoir 8A on the suction side thereof and to the cut valve 5A and the inlet valves 6A, 6B on the ejection side thereof, a second pump 10B connected to the second reservoir 8B on the suction side thereof and to the cut valve 5B and the inlet valves 6C, 6D on the ejection side thereof, an electric motor 11 for driving both the pumps 10A, 10B in common with each other, suction valves 12A, 12B provided interposed between the first and second output fluid pressure paths 3A, 3B and the suction side of the first and second pumps 10A, 10B, respectively, first and second dampers 13A, 13B to which the first and second pumps 10A, 10B are connected on the ejection side thereof, respectively, first and second orifices 14A, 14B provided between the first and second pumps 10A, 10B and the first and second dampers 13A, 13B, respectively, check valves 15A, 15B provided between the first and second pumps 10A, 10B and the first and second reservoirs 8A, 8B so as to allow the passage of brake fluid to the pumps 10A, 10B, respectively, a pressure sensor 16 mounted on the second output fluid pressure path 3B, one-way valves 18A, 18B connected in parallel to the cut valves 5A, 5B so as to allow the passage of brake fluid only from the first and second output fluid pressure paths 3A, 3B, and relief valves 19A, 19B connected in parallel to the cut valves 5A, 5B.

The suction valves 12A, 12B are connected to the middle point between the first and second pumps 10A, 10B and the check valves 15A, 15B, respectively. The outlet valves 9A to 9D are connected to the middle point between the check valves 15A, 15B and the first and second reservoirs 8A, 8B, respectively. Provided interposed between fluid pressure paths 20A, 20B communicated to the pumps 10A, 10B via the orifices 14A, 14B and the dampers 13A, 13B and the output fluid pressure paths 3A, 3B are the cut valves 5A, 5B, the one-way valves 18A, 18B and the relief valves 19A, 19B, respectively. The relief valves 19A, 19B open when the fluid pressure in the fluid pressure paths 20A, 20B rise beyond a predetermined value.

Such a brake fluid pressure controller 4 allows the communication between the master cylinder M and the wheel brakes 2A to 2D and the closure of the path between the wheel brakes 2A to 2D and the reservoirs 8A, 8B, respectively, during normal braking that makes it unlikely that the various wheels can undergo rocking. In other words, the cut valves 5A, 5B are demagnetized to open while the suction valves 12A, 12B are demagnetized to close. Under these conditions, the inlet valves 6A to 6D are demagnetized to open while the outlet valves 9A to 9D are demagnetized to close, causing the brake fluid pressure outputted from the first output portion of the master cylinder M to act on the front left and rear right wheel brakes 2A, 2B via the cut valve 5A and the inlet valves 6A, 6B, respectively. The brake fluid pressure outputted from the second output port 1B of the master cylinder M acts on the front right and rear left wheel brakes 2C, 2D via the cut valve 5B and the inlet valves 6C, 6D, respectively.

When the wheels are ready to undergo rocking during the aforementioned braking, the brake fluid pressure controller 4 allows the closure of the path the master cylinder M and the wheel brakes 2A to 2D and the communication between the wheel brakes 2A to 2D and the reservoirs 8A, 8B, respectively, to cope with the wheels which are ready to undergo rocking. In other words, those of the inlet valves 6A to 6D corresponding to the wheels which are ready to undergo rocking are excited to open while those of the outlet valves 9A to 9D corresponding to these wheels are excited to close. Under these conditions, the brake fluid pressure on the wheels which are ready to undergo rocking is partially sucked by the first and second reservoirs 8A and 8B, respectively, reducing the brake fluid pressure on the wheels which are ready to undergo rocking.

In order to keep the brake fluid pressure constant, the brake fluid pressure controller 4 causes the wheel brakes 2A to 2D to be disconnected from the master cylinder M and the reservoirs 8A, 8B, respectively. In other words, the inlet valves 6A to 6D are excited to close while the outlet valves 9A to 9D are demagnetized to close. In order to raise the brake fluid pressure, operation may be conducted such that the inlet valves 6A to 6D are demagnetized to open while the outlet valves 9A to 9D are demagnetized to close.

Thus, the demagnetization/excitation of the inlet valves 6A to 6D and the outlet valves 9A to 9D can be efficiently controlled without causing rocking of the wheels while the cut valves 5A, 5B are being demagnetized to open and the suction valves 12A, 12B are being demagnetized to close, respectively.

During the aforementioned anti-rock brake control, the electric motor 11 rotates. With this rotation of the electric motor 11, the first and second pumps 10A, 10B are driven. Thus, the brake fluid which has been sucked into the first and second reservoirs 8A, 8B is sucked by the fist and second pumps 10A, 10B, and then returned to the first and second output fluid pressure paths 3A, 3B via the first and second dampers 13A, 13B, respectively. The return flow of the brake fluid makes it possible to prevent the rise of stepping on the brake pedal P due to the suction of the brake fluid by the first and second reservoirs 8A, 8B. Further, the pulsation of ejection pressure of the first and second pumps 10A, 10B can be inhibited by the action of the first and second dampers 13A, 13B and the first and second orifices 14A, 14B, respectively, making it possible to prevent the aforementioned return flow from impairing the operational feeling of the brake pedal P.

The brake fluid pressure controller 4 can cause the electric motor 11 to drive the first and second pumps 10A, 10B and control the opening/closing of the cut valves 5A, 5B to perform anti-skidding control or anti-traction control of vehicle during non-braking operation.

The pressure sensor 16 detects to see if any fluid pressure has been outputted from the master cylinder M, i.e., if the brake pedal P has been stepped down. The pressure sensor 16 is used to control skidding or traction of vehicle or the rotary speed of the electric motor 11 according to the output fluid pressure of the master cylinder M.

Therefore, when anti-skidding control is effected for example, the cut valves 5A, 5B are excited to close while the suction valve 12A, 12B are excited to open. Further, the operation of the electric motor 11 causes the first and second pumps 10A, 10B to be driven, respectively. Those of the inlet valves 6A to 6D other than that corresponding to the wheels which are desired to be braked are excited to close.

Thus, the pumps 10A, 10B suck the brake fluid from the master cylinder M via the first and second ports 1A, 1B, the first and second output fluid pressure paths 3A, 3B and the suction valves 12A, 12B, respectively, while supplying the brake fluid into the selected ones of the wheel brakes 2A to 2D via those of the inlet valves 6A to 6D which are open. The back flow of the brake fluid toward the master cylinder M is inhibited by the closing of the cut valves 5A, 5B.

During the aforementioned anti-skidding control or anti-traction control, when the ejection pressure of the first and second pumps 10A, 10B, i.e., fluid pressure across the cut valves 5A, 5B and the inlet valves 6A to 6D, respectively, exceeds a predetermined value, the relief valves 19A, 19B cause the excess fluid pressure to be relieved toward the master cylinder M, avoiding the action of excess fluid pressure on the interior of the wheel brakes which are acted on by brake fluid pressure or the fluid pressure controller 4.

The outlet valves 9A to 9D are arranged according to the present invention and will be described in detail hereinafter. Since the outlet valves 9A to 9D have the same constitution, only the outlet valve 9A will be described in detail hereinafter. The other outlet valves 9B to 9D will not be described.

In FIG. 2, the outlet valve 9A comprises a cylindrical valve housing 22 having a thin wall, a cylindrical valve seat member 23 press-fitted in one end of the valve housing 22, a fixed core 24 fixed to the valve housing 22 in such an arrangement that the other end of the valve housing 22 is Airtightly closed, a movable core 26 housed in the valve housing 22 forming a valve chamber 25 with the valve seat member 23 and facing the fixed core 24, a spherical valve body 28 fixed to the movable core 26 seatably on a valve seat 27 formed on the valve seat member 23 facing the valve chamber 25, a return spring 29 provided between the movable core 26 and the fixed core 24 so as to energize the valve body 28 in such a direction that it is seated on the valve seat 27 and a coil 30 for generating an electromagnetic force that causes the movable core 26 to be attracted to the fixed core 24 during excitation.

Provided at the axially middle portion of the valve housing 22 is a large diameter portion 22b forming a tapered or otherwise shaped stepped portion 22a facing toward the axially other end thereof and expanding radially and outwardly. The large diameter portion 22b forms a plurality of, e.g., three steps such that it decreases gradually in diameter toward the axially one end of the valve housing 22. The valve housing 22 has an outlet hole 31 provided on the axially one end thereof. Provided at the middle portion of the large diameter portion 22b are a plurality of inlet holes 32 as communicating holes.

The valve seat member 23 forms with the inner surface of the large diameter portion 22b an annular chamber 45 communicating to the valve chamber 25 and is fitted in one end of the valve housing 22. The inlet holes 32, 32 are provided on the large diameter portion 22b of the valve housing 22 in such an arrangement that they are communicated to the annular chamber 45.

The valve housing 22 is housed in and fixed to a block substrate 33 formed by aluminum alloy or the like on one end thereof. The substrate 33 is provided with a mounting hole 34 for receiving the valve housing 22 comprising the stepped portion 22a and the large diameter portion 22b therein on one end thereof. The mounting hole 34 has a small diameter portion 34a, a middle diameter portion 34b having a large diameter than the small diameter portion 34a and a large diameter portion 34c having a larger diameter than the middle diameter portion 34b formed continuously and coaxially in this order from an axially one end thereof. The small diameter portion 34a is formed having a diameter allowing the valve housing 22 to be fitted in the mounting hole 34 on one end thereof deviating from the large diameter portion 22b. The other end of the large diameter portion 34c is open at the one surface 33a of the substrate 33.

The one end of the valve housing 22 is kept housed in the mounting hole 34 by a retaining unit 48 which is detachably mounted in the substrate 33 in contact engagement with the stepped portions 22a. The retaining unit 48 is formed by a ring-shaped retainer ring 35 mounted on the periphery of the valve housing 22 in contact engagement with the stepped portion 22a on the axially outer side of the mounting hole 34 and a retaining ring 36 which is detachably mounted on the inner surface of the mounting hole 34 in contact engagement with the retainer ring 35 on the axially external side thereof. The provision of the retaining unit 48 prevents the valve housing 22 from being detached from the mounting hole 34, making it possible to keep the valve housing 22 housed in and fixed to the substrate 33 on one end thereof.

The valve seat member 23 forms an annular chamber 45 with the inner surface of the large diameter portion 22b communicating to the valve chamber 25 and is fixed fitted on one end of the valve housing 22. The inlet holes 32 are provided in the large diameter portion 22b of the valve housing 22 communicating to the annular chamber 45.

Formed between the inner surface of the middle diameter portion 34b and the large diameter portion 34c of the mounting hole 34 and the outer surface of the valve housing 22 is an annular path 37 communicating to the annular chamber 45 via the inlet holes 32, 32. The substrate 33 is provided also with a path 39 coaxially communicating to the small diameter portion 34a of the mounting hole 34 so as to communicate to the outlet hole 31 of the valve housing 22. The path 39 is connected to the first reservoir 8A.

An O-ring 40 is mounted on the periphery of the other end of the valve housing 22 between the annular path 37 and the path 39. An O-ring 41 is mounted on the periphery of the other end of the large diameter portion 22b, i.e., the largest diameter portion of the valve housing 22 with the annular path 37 interposed between the O-ring 41 and the O-ring 40.

By predetermining the diameter of the O-ring 40 which comes in elastic contact with the inner surface of the inner end of the mounting hole 34 smaller than that of the O-ring 41 which comes in elastic contact with the inner surface of the outer end of the mounting hole 34, the O-ring 40 can be prevented as much as possible from being scratched due to contact with the inner surface of the mounting hole 34 during the reception and incorporation of the valve housing 22 in the mounting hole 34. Further, the power required to receive and incorporate the valve housing 22 in the mounting hole 34 can be reduced, facilitating the reception and incorporation of the valve housing 22 in the mounting hole 34.

Further, the O-ring 40 is mounted on one end of the valve housing 22 facing the stepped portion formed between the small diameter portion 34a and the middle diameter portion 34b of the mounting hole 34. The valve housing 22 is housed in the mounting hole 34 on one end thereof in such an arrangement that it is restricted in its axially inward movement in the mounting hole 34 because the O-ring 40 comes in contact with the stepped portion formed between the small diameter portion 34a and the middle diameter portion 34b.

Mounted on the periphery of the valve housing 22 between the O-rings 40 and 41 is a filter 42 through which the inlet holes 32, 32 are communicated to the annular path 37.

The fixed core 24 is liquid-tightly laser-welded or otherwise welded to the other end of the valve housing 22. The portion of the valve housing 22 which protrudes from one surface 33a of the substrate 33 and the fixed core 24 are removably housed in a solenoid portion 49 including the coil 30. The solenoid portion 49 is formed by a bobbin 43 having the coil 30 wound thereround and a coil case 44 made of a magnetic material magnetically connected to the fixed core 24 covering the bobbin 43 and the coil 30. In this arrangement, the electromagnetic force generated by the coil 30 during its excitation causes the movable core 26 to be attracted to the fixed core 24.

Provided on the periphery of the movable core 26 along the entire axial length thereof is a communicating groove 46 through which the space between the fixed core 24 and the movable core 26 is communicated to the valve chamber 25.

In this outlet valve 9A, when the coil 30 is in demagnetized state, the spring force of the return spring 29 causes the movable core 26 to move away from the fixed core 24 as shown in FIG. 2. In this state, the valve body 28 seats on the valve seat 27 and the outlet valve 9A opens, keeping the rear left wheel brake 2A and the first reservoir 8A disconnected from each other.

On the other hand, when the coil 30 is excited, as shown in FIG. 3, the movable core 26 is attracted to the fixed core 24 against the spring force of the return spring 29. In this manner, the valve body 29 leaves the valve seat 27 to open the outlet valve 9A, allowing the communication between the rear left wheel brake 2A and the first reservoir 8A.

Referring next to the action of the present embodiment, the valve housing 22 of the outlet valves 9A to 9D is housed in the mounting hole 34 provided in the substrate 33 on one end thereof in such an arrangement that it is restricted in its axial movement toward the interior of the mounting hole 34. Provided in the axially middle portion of the valve housing 22 is a large diameter portion 22b having a stepped portion 22a formed facing the axially other end of the valve housing 22. Mounted on the inner surface of the mounting hole 34 is a retaining ring 36 which is housed in the mounting hole 34 from the axially external end thereof in contact engagement with the retainer ring 35 housed in the mounting hole 34 in contact engagement with the stepped portion 22a.

Accordingly, the valve housing 22 is housed in the mounting hole 34 in the substrate 33 on one end thereof with the retainer ring 35 in contact engagement with the stepped portion 22a of the valve housing 22 and the retaining ring 36 is mounted on the external end of the mounting hole 34 in contact engagement with the retainer ring 35, making it possible to mount the valve housing 22 on the substrate 33 and hence making it easy to incorporate the valve housing 22 in the substrate 33. Thus, the mountability of the valve housing 22 can be improved. Further, the retaining ring 36 can be removed from the external end of the mounting hole 34, making it easy to remove the valve housing 22 from the mounting hole 34 and hence making it possible to enhance recyclability.

Moreover, the cylindrical valve seat member 23 forms an annular chamber 45 with the inner surface of the large diameter portion 22b communicating to the valve chamber 25 and is fixed fitted on one end of the valve housing 22. Provided in the large diameter portion 22b are inlet holes 32 through which the annular chamber 45 is communicated to an annular passage 37 outside the valve housing 22. In this arrangement, the degree of freedom of predetermination of the position of the inlet holes 32 can be enhanced.

In other words, in the case where the valve housing 22 is in the form of simple cylinder which is uniform in diameter all over the axial length, it is necessary that the valve chamber 25 and the various inlet holes 32 be at substantially the same position along the axial length of the valve housing 22. When the valve housing 22 is provided with the large diameter portion 22b, the annular chamber 45 communicating to the valve chamber 25 can be formed between the valve housing 22 and the valve seat member 23. In this arrangement, the degree of freedom of positioning of the valve chamber 25 along the axial length of the valve housing 22 can be raised, making it possible to reduce the axial length of the movable core 26 and hence the sliding resistance thereof. Further, the mass of the movable core 26 can be reduced, making it possible to raise the degree of freedom of design.

In FIG. 4, the substrate 33 comprises inlet valves 6A to 6D having check valves 7A to 7D incorporated therein and suction valves 12A, 12B mounted thereon with their solenoid portions 50 protruding from one surface 33a thereof besides the outlet valves 9A to 9D. The substrate 33 further comprises cut valves 5A, 5B having one-way valves 18A, 18B and relief valves 19A, 19B mounted on the substrate 33 with their solenoid portions (not shown) protruding from one surface 33a thereof and juxtaposed to the suction valves 12A, 12B in such an arrangement that regulators 21A, 21B are formed with the one-way valves 18A, 18B and the relief valves 19A, 19B, respectively.

The electric motor 11 is mounted on the other surface 33b of the substrate 33. The first and second pumps 10A, 10B to be driven by the electric motor 11 are incorporated in the substrate 33. The first and second reservoirs 8A, 8B each are provided in the substrate 33 partially protruding from the one surface 33a thereof. The first and second check valves 15A, 15B are provided in the substrate 33 interposed between the first and second reservoirs 8A, 8B and the first and second pumps 10A, 10B, respectively. Though not shown, the first and second dampers 13A, 13B and the first and second orifices 14A, 14B are incorporated in the substrate 33. The pressure sensor 16 is provided in the substrate 33 with its housing 52 partially protruding from the one surface 33a of the substrate 33.

To the one surface 33a of the substrate 33 is fastened a cover 55 comprising a first cylindrical resin-molded body 53 having a rectangular transverse cross section having a second resin-molded body 54 vibration-welded to one end thereof for closing one end opening thereof. This cover 55 is detachably fastened or otherwise attached to the one surface 33a of the substrate 33 covering the solenoid portion 51 of the inlet valves 6A to 6D, the solenoid portion 49 of the outlet valves 9A to 9D, the solenoid portion 52 of the cut valves 5A, 5B, the solenoid portion of the suction valves 12A, 12B, part of the first and second reservoirs 8A, 8B and part of the pressure sensor 16. Further, the cover 55 has an endless sealing member 56 mounted on the edge thereof closest to the substrate 33 which comes in elastic contact with the one surface 33a of the substrate 33.

The cover 55 has a flat wall 60 formed integrally having rectangular openings 57, 58 and 59 corresponding to the solenoid portion 51 of the inlet valves 6A to 6D, the solenoid portion 49 of the outlet valves 9A to 9D and the solenoid portion 52 of the cut valves 5A, 5B, respectively, and facing the one surface 33a of the substrate 33 at the middle portion inside the first resin-molded body 53.

The solenoid portions 50, 49, 51 have their forward ends housed in the openings 57, 58, 59, respectively, and a pair of electromagnetic valve side connecting terminals 61, 62, 63 protruding therefrom and extending through the openings 57, 58, 59, respectively.

The wall 60 has individual bus bars (not shown) made of an electrically-conductive metal corresponding to the inlet valves 6A to 6D, the outlet valves 9A to 9D, the cut valves 5A, 5B and the suction valves 12A, 12B and a single common bus bar (not shown) made of an electrically-conductive metal common to these valves 6A to 6D, 9A to 9D, 5A, 5B and 12A, 12B embedded therein.

The electromagnetic valve side connecting terminals 61, 62, 63 have individual bus bar side connecting terminals 64, 65, 65 formed at one end of the individual bus bars electrically connected thereto on one end thereof, respectively, and a plurality of common bus bar side connecting terminals (not shown) formed in the common bus bar electrically connected thereto on the other.

Three pressure sensor side terminal areas 67 are protruded from the other end of the housing 52 of the pressure sensor 16. On the other hand, on wall portion 60 of the cover 55, opening portion 68 corresponding to the other end portion of the housing 52 is formed, and the pressure sensor side terminal areas are protruded from the housing 52 so as to penetrate the opening portion 68. Further, under the wall portion 60, three bus bars made of conductive metal and corresponding to the pressure sensor 16 are laid and bus bar side terminal areas each formed on one side of the bus bar are electrically connected onto the pressure sensor side terminal areas by welding respectively.

Disposed in the cover 55 between the wall 60 and the second resin-molded body 54 is a board on which an electrical circuit is provided. The board 70 is fixedly supported on a plurality of supporting bosses 71 protruding from the wall 60.

In this arrangement, the individual bus bars and the common bus bar corresponding to the inlet valves 6A to 6D, the outlet valves 9A to 9D, the cut valves 5A, 5B and the suction valves 12A, 12B are electrically connected to the electrical circuit on the board 70. The other end of the bus bar corresponding to the pressure sensor 16 extends through the board 70 and is electrically connected to the electrical circuit on the board 70.

In other words, the solenoid portion 50 of the inlet valves 6A to 6D, the solenoid portion 49 of the outlet valves 9A to 9D, the solenoid portion 51 of the suction valves 12A, 12B, the solenoid portion of the cut valves 5A, 5B and the housing 52 of the pressure sensor 16 are supported by the cover 55 which is detachably mounted on the one surface 33a of the substrate 33.

Referring next to the action of the first embodiment, the valve housing 22 of the outlet valves 9A to 9D each are housed in the mounting hole 34 provided in the substrate 33 on one end thereof in such an arrangement that it is restricted in its axial inward movement in the mounting hole 34. Further, provided at the axially middle portion of the valve housing 22 is the large diameter portion 22b formed having the stepped portion 22a facing the axially other end of the valve housing 22. The retaining unit 48 which comes in contact engagement with the stepped portion 22a to keep the valve housing 22 housed in the mounting hole 34 on one end thereof is detachably mounted on the substrate 33. The solenoid portion 49 which allows the protrusion of the valve housing 22 from the substrate 33 to be removably housed in the substrate 33 is supported on the cover 55 which is detachably mounted on the substrate 33 covering the solenoid portion 49.

Accordingly, by mounting the retaining unit 48 on the substrate 33 with the valve housing 22 housed in the mounting hole 34 on one end thereof, the valve housing 22 can be easily incorporated in the substrate 33. By removing the retaining unit 48 from the substrate 33, the valve housing 22 can be detached from the mounting hole 34 on one end thereof. Further, the protrusion of the valve housing 22 from the substrate 33 can be detachably housed in the solenoid portion 49 including the coil 30. In this arrangement, by removing the cover 55 on which the solenoid portion 49 is supported from the substrate 33, the solenoid portion 49 including the coil 30 can be easily separated from the valve housing 22, making it possible to mount the valve housing 22 on the substrate 33 or remove the valve housing 22 from the substrate 33 on one end thereof. By mounting the cover 55 on the substrate 33 with the valve housing 22 incorporated in the substrate 33 on one end thereof, the protrusion of the valve housing 22 from the substrate 33 can be housed in the solenoid portion 49 to form the outlet valves 9A to 9D as a whole. In this arrangement, the valve housing 22 can be easily incorporated in and removed from the substrate 33, making it possible to enhance mountability as well as recyclability.

Further, the retaining unit 48 is formed by a ring-shaped retainer ring 35 mounted on the periphery of the valve housing 22 in contact engagement with the stepped portion 22a on the axially outer side of the mounting hole 34 and a retaining ring 36 which is detachably mounted on the inner surface of the large diameter portion 34a of the mounting hole 34 close to the external end thereof in contact engagement with the retainer ring 35 on the axially external side thereof.

Accordingly, by inserting the valve housing 22 in the mounting hole 34 of the substrate 33 on one end thereof with the retainer ring 35 in contact engagement with the stepped portion 22a of the valve housing 22 and mounting the retaining ring 36 on the external end of the mounting hole 34 in contact engagement with the retainer ring 35, the valve housing 22 can be mounted on the substrate 33, making it easy to mount the valve housing 22 on the substrate 33 and hence enhance its mountability.

Moreover, the cylindrical valve seat member 23 forms an annular chamber 45 with the inner surface of the large diameter portion 22b communicating to the valve chamber 25 and is fixed and fitted on one end of the valve housing 22. Provided in the large diameter portion 22b are inlet holes 32 through which the annular chamber 45 is communicated to an annular passage 37 outside the valve housing 22. In this arrangement, the degree of freedom of predetermination of the position of the inlet holes 32 can be enhanced.

In other words, in the case where the valve housing 22 is in the form of simple cylinder which is uniform in diameter all over the axial length, it is necessary that the valve chamber 25 and the various inlet holes 32 be at substantially the same position along the axial length of the valve housing 22. When the valve housing 22 is provided with the large diameter portion 22b, the annular chamber 45 communicating to the valve chamber 25 can be formed between the valve housing 22 and the valve seat member 23. In this arrangement, the degree of freedom of positioning of the valve chamber 25 along the axial length of the valve housing 22 can be raised, making it possible to reduce the axial length of the movable core 26 and hence the sliding resistance thereof. Further, the mass of the movable core 26 can be reduced, making it possible to raise the degree of freedom of design.

Figure 5:
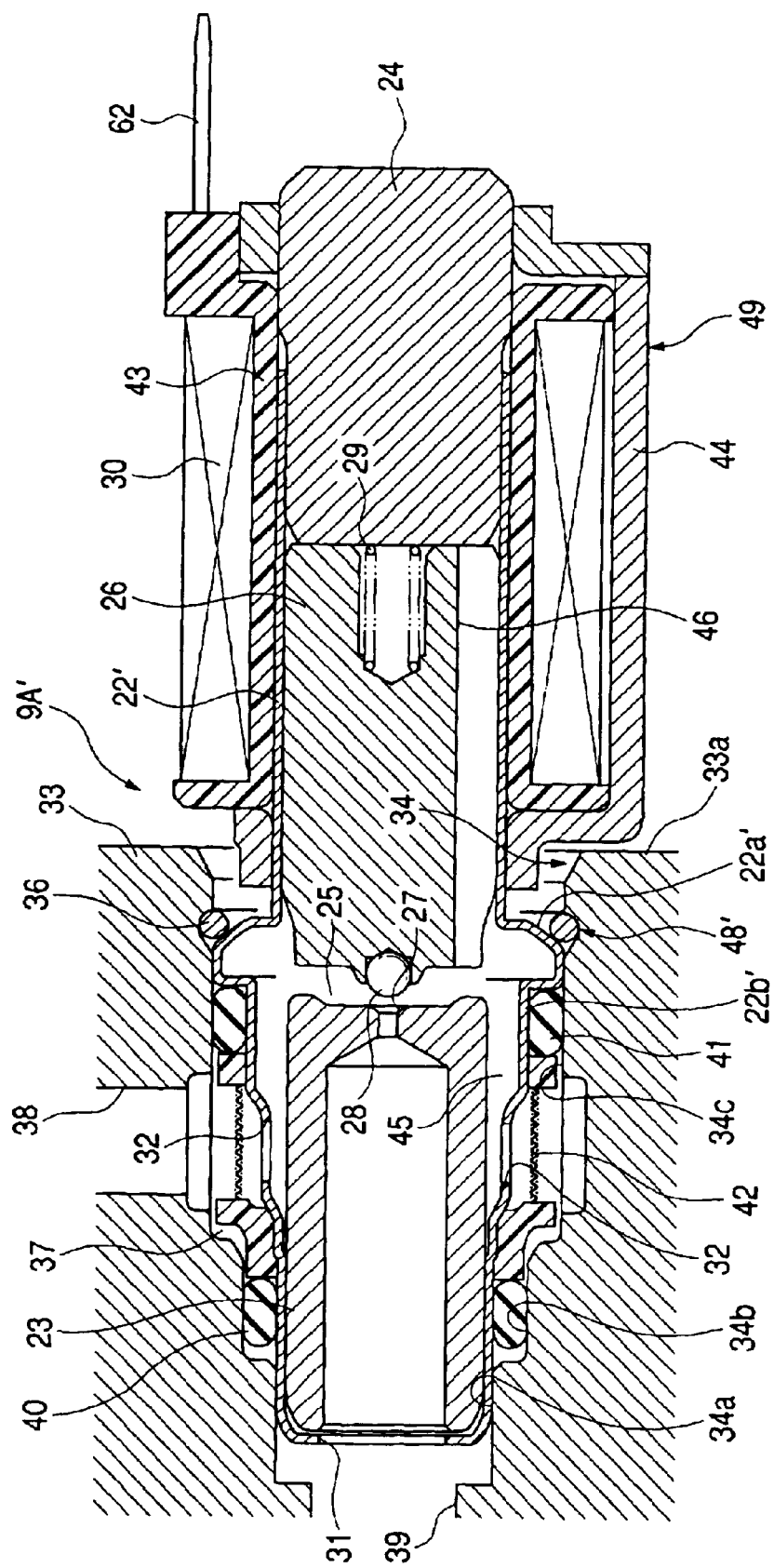
FIG. 5 is a sectional view of a second embodiment corresponding to FIG. 2.

FIG. 5 is a diagram illustrating a second embodiment of implementation of the present invention. Where the parts are the same as those of the aforementioned first embodiment, the same numbers are used.

Provided at the axially middle portion of a cylindrical valve housing 22 having a thin wall provided in an outlet valve 9A' is a large diameter portion 22b' forming a tapered or otherwise shaped stepped portion 22a' facing toward the axially other end thereof and expanding radially and outwardly. The large diameter portion 22b' forms a plurality of, e.g., three steps such that it decreases gradually in diameter toward the axially one end of the valve housing 22'. The valve housing 22' has an outlet hole 31 provided on the axially one end thereof. Provided at the middle portion of the large diameter portion 22b' are a plurality of inlet holes 32 as communicating holes.

The valve housing 22 is housed in and fixed to a block substrate 33 formed by aluminum alloy or the like on one end thereof. The substrate 33 is provided with a mounting hole 34 for receiving the valve housing 22 comprising the stepped portion 22a and the large diameter portion 22b therein on one end thereof. The mounting hole 34 has a small diameter portion 34a, a middle diameter portion 34b having a large diameter than the small diameter portion 34a and a large diameter portion 34c having a larger diameter than the middle diameter portion 34b formed continuously and coaxially in this order from an axially one end thereof. The small diameter portion 34a is formed having a diameter allowing the valve housing 22 to be fitted in the mounting hole 34 on one end thereof deviating from the large diameter portion 22b. The other end of the large diameter portion 34c is open at the external surface of the substrate 33.

The one end of the valve housing 22' is kept housed in the mounting hole 34 by a retaining unit 48' as a retaining unit which is detachably mounted in the substrate 33 in contact engagement with the stepped portions 22a'.

In accordance with the second embodiment, too, the valve housing 22' can be easily mounted on the substrate 33 and removed from the substrate 33, making it possible to enhance mountability as well as recyclability.

While the present invention has been described with reference to embodiments thereof, the present invention is not limited thereto and various design changes and modifications can be made therein without departing from the spirit and scope thereof.

As mentioned above, in accordance with the first aspect of the present invention, the degree of freedom of positioning of the valve chamber along the axial length of the valve housing can be raised to enhance the degree of freedom of predetermination of position of the communicating holes and reduce the axial length and hence the mass of the movable core, making it possible to raise the degree of freedom of design.

As mentioned above, in accordance with the present invention defined in the second aspect, the valve housing can be easily mounted on the substrate and removed from the substrate, making it possible to enhance mountability as well as recyclability.

Moreover, in accordance with the present invention defined in the third aspect, the valve housing can be easily incorporated in the substrate to enhance mountability, making it easy to remove the valve housing from the mounting hole.

What is claimed is:

1. A normally closed electromagnetic valve comprising:
a cylindrical valve housing having a thin wall;

a valve seat member fitted in and fixed to one end of the valve housing;

a fixed core fixed liquid-tightly to the other end of the valve housing;

a movable core forming a valve chamber with the valve seat member and housed in the valve housing so as to be opposed to the fixed core;

a valve body fixed to the movable core seatably on a valve seat formed on the valve seat member facing the valve chamber;

a return spring provided between the fixed core and the movable core and giving a spring force that causes the valve body to be seated on the valve seat; and, a coil for generating an electromagnetic force that causes the movable core to be attracted to the fixed core during excitation, wherein a large diameter portion is provided in the axially middle portion of the valve housing.

2. The normally closed electromagnetic valve as set forth in claim 1, wherein the cylindrical valve seat member forms an annular chamber with the inner surface of the large diameter portion, the annular chamber communicates to the valve chamber, and is fixed to and fitted in one end of the valve housing and communicating holes through which the annular chamber is communicated to the exterior of the valve housing are provided in the large diameter portion.

3. The normally closed electromagnetic valve as set forth in claim 1, wherein one side of the valve housing is housed in a mounting hole opened on one end of a substrate so as to be restricted in axial movement thereof toward the interior of the mounting hole.

4. The normally closed electromagnetic valve as set forth in claim 2, wherein one side of the valve housing is housed in a mounting hole opened on one end of a substrate so as to be restricted in axial movement thereof toward the interior of the mounting hole.

5. The normally closed electromagnetic valve as set forth in claim 3, further comprising:

retaining units for keeping one end of the valve housings housed in the mounting hole in contact engagement with the stepped portions of the large diameter portion; and, a solenoid portion removably fitted on the protrude portion of the valve housings from the substrate so as to include the coil, wherein the retaining units are detachably provided in the substrate and the solenoid portion is supported on a cover which is detachably mounted on the substrate and covers the solenoid.

6. The normally closed electromagnetic valve as set forth in claim 4, further comprising:

retaining units for keeping one end of the valve housings housed in the mounting hole in contact engagement with the stepped portions of the large diameter portion; and, a solenoid portion removably fitted on the protrude portion of the valve housings from the substrate so as to include the coil, wherein the retaining units are detachably provided in the substrate and the solenoid portion is supported on a cover which is detachably mounted on the substrate and covers the solenoid.

7. The normally closed electromagnetic valve as set forth in claim 5, wherein the retaining unit includes a retainer ring housed in the mounting hole and contacting and engaging with the stepped portion, and a retaining ring detachably mounted on the inner surface of the mounting hole and contacting and engaging with the retainer ring on the axially external side of the mounting hole.

8. The normally closed electromagnetic valve as set forth in claim 6, wherein the retaining unit includes a retainer ring housed in the mounting hole and contacting and engaging with the stepped portion, and a retaining ring detachably mounted on the inner surface of the mounting hole and contacting and engaging with the retainer ring on the axially external side of the mounting hole.

* * * * *